(12) United States Patent
Venkataramani et al.

(10) Patent No.: US 7,729,074 B2
(45) Date of Patent: Jun. 1, 2010

(54) ZONE BASED TIMING RECOVERY FOR BIT PATTERNED MEDIA

(75) Inventors: Raman Chatapuram Venkataramani, Pittsburgh, PA (US); Sundararajan Sankaranarayanan, Pittsburgh, PA (US); Mehmet Fatih Erden, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 361 days.

(21) Appl. No.: 11/770,181

(22) Filed: Jun. 28, 2007

(65) Prior Publication Data

US 2009/0002865 A1 Jan. 1, 2009

(51) Int. Cl.
*G11B 5/09* (2006.01)

(52) U.S. Cl. .................................................. 360/51

(58) Field of Classification Search .................. 360/51, 360/55, 47, 48, 135, 77.08, 31, 40; 428/846.3, 428/848.5
See application file for complete search history.

(56) References Cited

U.S. PATENT DOCUMENTS

| | | | |
|---|---|---|---|
| 4,772,963 A * | 9/1988 | Van Lahr et al. ............... 360/47 |
| 6,233,107 B1 | 5/2001 | Minuhin | |
| 6,643,082 B1 | 11/2003 | Belser | |
| 6,738,207 B1 | 5/2004 | Belser et al. | |
| 6,751,035 B1 | 6/2004 | Belser | |
| 6,754,017 B2 | 6/2004 | Rettner et al. | |
| 6,882,488 B1 * | 4/2005 | Albrecht et al. ............... 360/55 |
| 6,906,879 B1 * | 6/2005 | Albrecht et al. ............... 360/55 |
| 6,947,235 B2 * | 9/2005 | Albrecht et al. ............... 360/55 |
| 6,967,798 B2 * | 11/2005 | Homola et al. ................. 360/48 |
| 7,019,924 B2 | 3/2006 | McNeil et al. | |
| 7,064,914 B1 | 6/2006 | Erden et al. | |
| 7,184,234 B2 | 2/2007 | Kim | |
| 7,236,325 B2 * | 6/2007 | Albrecht et al. .......... 360/77.08 |
| 2004/0174636 A1 * | 9/2004 | Suzuki et al. ............... 360/135 |
| 2005/0264922 A1 | 12/2005 | Erden et al. | |
| 2006/0092541 A1 | 5/2006 | Moser | |
| 2006/0280975 A1 * | 12/2006 | Albrecht et al. .......... 428/848.5 |
| 2008/0080082 A1 * | 4/2008 | Erden et al. ................. 360/51 |
| 2008/0274381 A1 * | 11/2008 | Fullerton et al. ......... 428/846.3 |
| 2008/0292907 A1 * | 11/2008 | Berger et al. ............... 428/828 |
| 2008/0304173 A1 * | 12/2008 | Albrecht et al. ............... 360/51 |

* cited by examiner

Primary Examiner—Fred Tzeng
(74) Attorney, Agent, or Firm—Robert P. Lenart, Esq.; Pietragallo Gordon Alfano Bosick & Raspanti, LLP

(57) ABSTRACT

A method includes: producing a bit detection signal in response to a plurality of islands located in a plurality of zones of a bit patterned media, processing the bit detection signal to produce a synchronization signal, wherein the processing is dependent on characteristics of the islands in the zone containing the plurality of islands, and using the synchronization signal to control timing of writing to the bit patterned media. The synchronization signal can also be used to control timing of reading from the bit patterned media.

18 Claims, 6 Drawing Sheets

ZONE BASED TIMING RECOVERY FOR BIT PATTERNED MEDIA

BACKGROUND

Magnetic recording on bit patterned media (BPM) is seen as a way to increase the areal recording density compared to conventional magnetic recording while avoiding the problem of the super-paramagnetic limit. The surface of the recording medium includes an array of islands and trenches. Different geometries are possible for the bit island locations including the staggered geometry.

In bit patterned media, the magnetic material on a disc is patterned into small isolated blocks or islands such that there is a single magnetic domain in each island or "bit". The single magnetic domains can be a single grain or a plurality of strongly coupled grains that switch magnetic states in concert as a single magnetic volume. This is in contrast to continuous media wherein a single "bit" may have multiple magnetic domains separated by domain walls. The media may be fabricated so that there is no magnetic material in the regions between the blocks.

In magnetic recording systems that use continuous media, there is no need to synchronize the writing of the data with the position of the media. For this reason, the data is written using a free running clock and sampling instances are recovered during the read process. However, for bit patterned media, the locations of the bits to be written are predefined (i.e., on the bit islands), and write synchronization is needed.

SUMMARY

In one aspect, the invention provides a method including: producing a bit detection signal in response to a plurality of islands located in a plurality of zones of a bit patterned media, processing the bit detection signal to produce a synchronization signal, wherein the processing is dependent on characteristics of the islands in the zone containing the plurality of islands, and using the synchronization signal to control timing of writing to the bit patterned media.

In another aspect, the invention provides an apparatus including a bit pattern sensor for producing a bit detection signal in response to a plurality of islands located in a plurality of zones of a bit patterned media, circuitry for processing the bit detection signal to produce a synchronization signal, wherein the processing is dependent on characteristics of the islands in the zone containing the plurality of islands, and a write driver for using the synchronization signal to control timing of writing to the bit patterned media.

These and various other features and advantages will be apparent from a reading of the following detailed description.

DETAILED DESCRIPTION OF THE INVENTION

This invention relates generally to magnetic storage devices that include bit patterned magnetic storage media, wherein each data bit is stored in a magnetically isolated block on the media. In such magnetic storage devices, the timing of writing the data is controlled in response to locations of islands in the media. In one aspect, this invention provides a method and apparatus for timing recovery in data storage devices that include bit patterned media (BPM).

Figure 1:
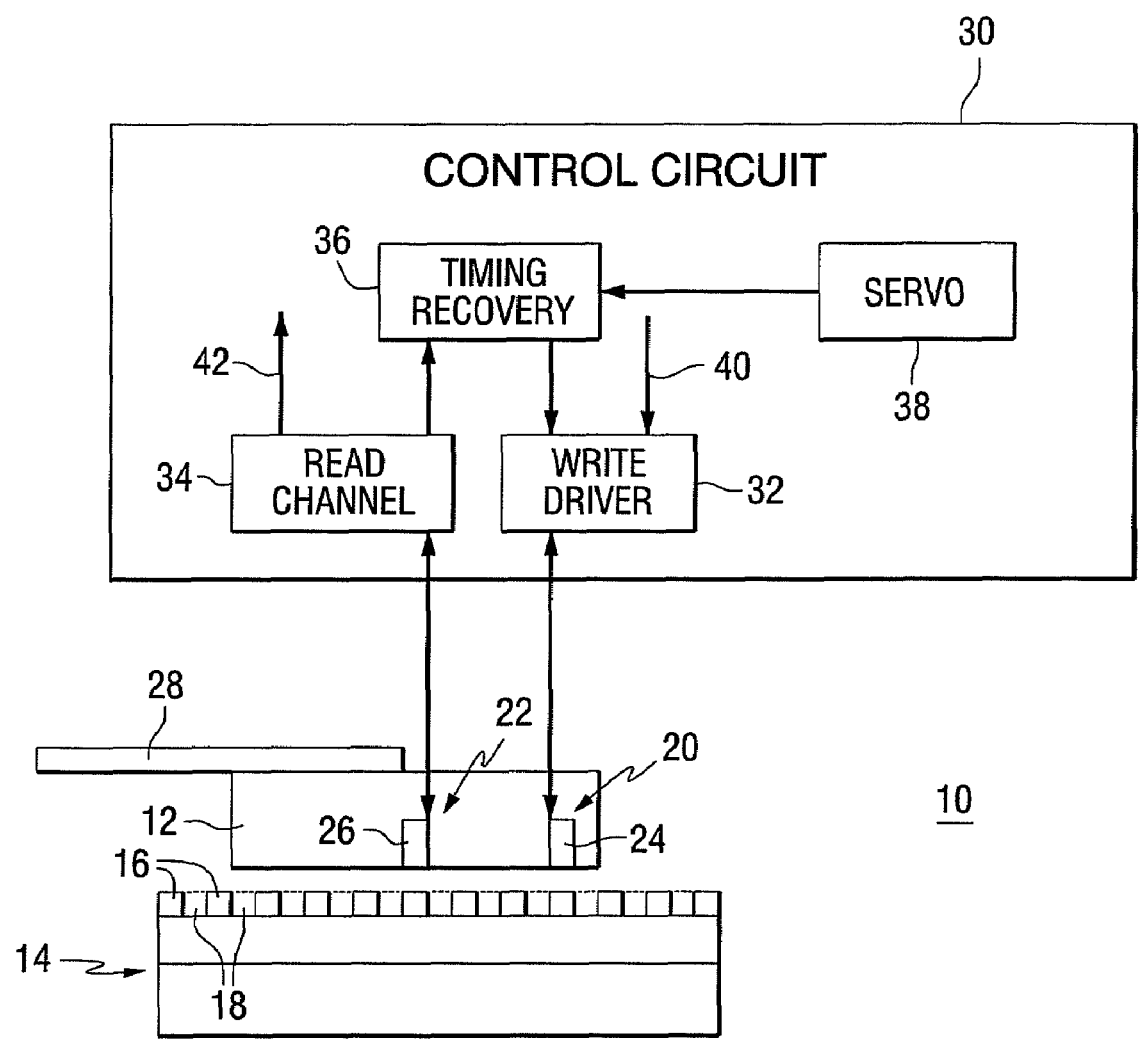
FIG. 1 is a schematic representation of portions of a data storage device.

FIG. 1 is a schematic representation of portions of a data storage device 10 including a carrier or slider 12 and an associated data storage media 14. In this example, the data storage media is a bit patterned media including a plurality of islands 16 of magnetic material separated by trenches 18, which may be filled with non-magnetic material.

The slider is positioned adjacent to a surface of the storage media in accordance with known techniques, and includes a write head 20 and a read head 22. The write head includes a write transducer 24 that applies a magnetic field to the storage media to control the direction of magnetization of the islands. The read head includes a sensor 26, such as a magnetoresistive (MR) sensor, giant magnetoresistive (GMR) sensor, or tunneling magnetoresistive (TMR) sensor, that produces an analog voltage signal in response to magnetic fields produced by the magnetized islands. An arm 28 can be used to position the slider with respect to the media. The arm can be controlled in accordance with known servo techniques.

In normal operation, the slider flies over a track (or a pair of sub-tracks if the bit pattern is staggered), wherein the tracks include a plurality of bit islands separated by trenches. The write head passes close enough to the islands to magnetize the whole bit island to the desired polarization (up or down, for example) depending on the information bit being written. However, the write head field does not penetrate the trenches well, and no information is written in the trenches. In effect the trenches act as stable domain wall boundaries between neighboring bits.

The read and write heads are connected to a control circuit 30 that includes a write channel including a write driver 32 for delivering voltage or current write pulses to the write head and a read channel 34 for processing signals produced by the read head. A timing recovery circuit 36 uses the read signals to provide a control signal that can be used to adjust the timing of the write pulses. A servo circuit 38 supplies additional information to the timing recovery circuit.

Disc drives may include a rotary voice-coil-motor (VCM) actuator for positioning the read/write heads. The servo control system receives servo positioning information read by the read/write heads from the data tracks, typically from equally-angularly-spaced servo sectors that extend generally radially across the tracks. The servo control system generates control signals to the VCM to maintain the read/write heads on track and move them to the desired tracks for reading and writing of data. The servo sectors also contain servo timing marks (STMs) that indicate the start of the servo sectors. The bit islands may be used to produce a reference clock signal for a write clock which controls the timing of the write pulses from the disc drive write head.

The additional information supplied by the servo to the timing recovery circuit can specify the position of the slider and/or the read sensor and write head with respect to the bit patterned storage media. This information is available in known servo systems, and can be used to identify a zone on the media where the islands have common characteristics.

The control circuit can contain other elements that are not specifically related to this description, and are therefore not shown. The write channel can communicate with other components in the control circuit and/or with a host device on a bus 40. The read channel can communicate with other components in the control circuit and/or with a host device on a bus 42.

A challenge in the implementation of bit patterned recording is timing recovery or synchronization. The write driver needs to be aware of positions of the bit islands in order to precisely switch the write fields as the write transducer passes over a track. Similarly, the read sensor needs to recover the correct sampling instants from the readback waveform. Failures in write synchronization may cause insertion/deletion errors of the bits as well as unintended bit flips.

Figure 2:
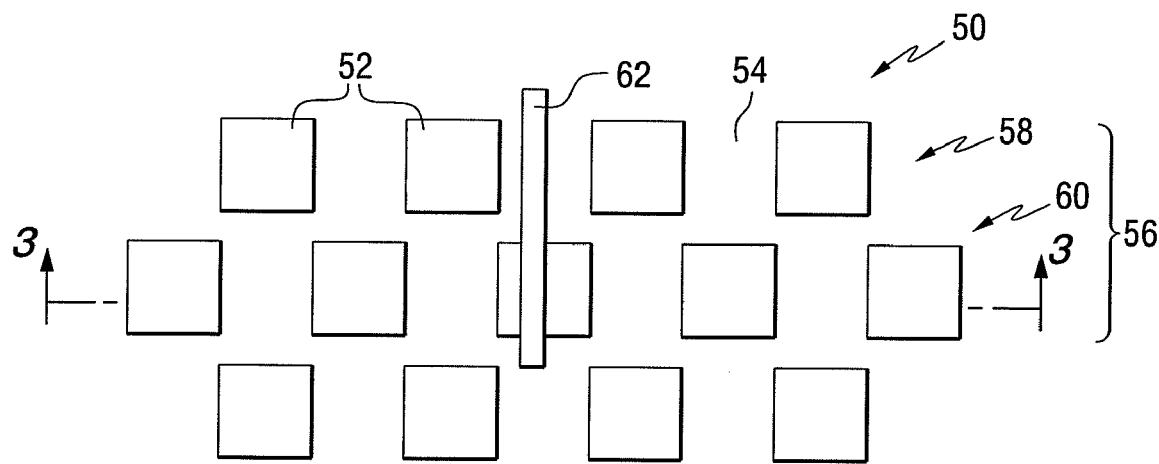
FIG. 2 is a schematic plan view of a bit patterned media.

FIG. 2 is a schematic plan view of a bit patterned media 50. The media includes a plurality of islands 52 of magnetic material separated by trenches 54. In this example, the islands are arranged in a staggered configuration to form a data track 56, comprised of two sub-tracks 58 and 60. A sensor 62 is positioned adjacent to the track. The sensor can be a read sensor as shown in FIG. 1, or a separate sensor that produces a signal in response to the passage of bit islands near the sensor or in response to the presence of bit islands near the sensor. Examples of such sensors include magnetoresistive (MR) sensors, giant magnetoresistive (GMR) sensors, tunneling magnetoresistive (TMR) sensors, thermal sensors, or capacitive sensors. In this description, the sensor 62 is referred to as a bit pattern sensor, regardless of whether it is a read sensor as shown in FIG. 1 or a separate sensor. The separate sensor can be mounted on the slider.

Figure 3:
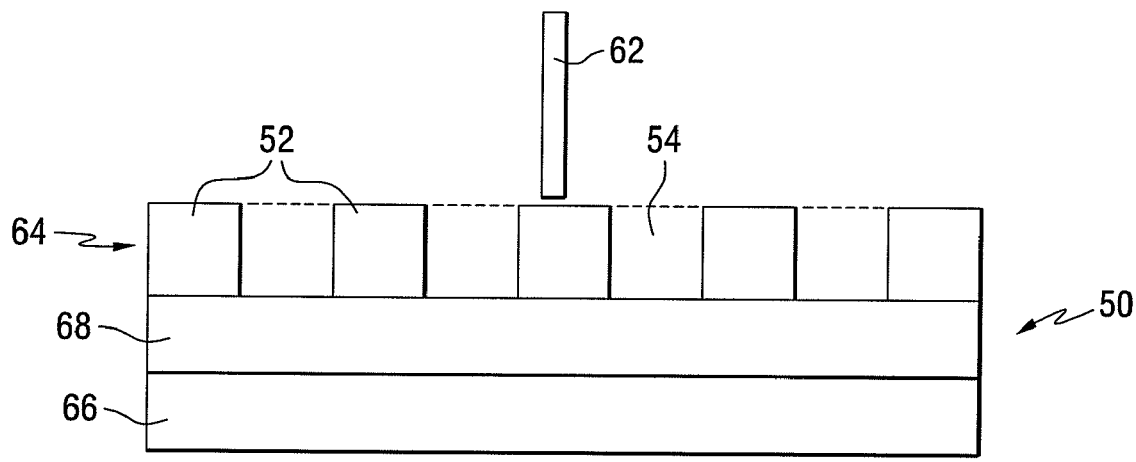
FIG. 3 is a cross-sectional view of the bit patterned media of FIG. 2.

FIG. 3 is a cross-sectional view of the bit patterned media of FIG. 2. The magnetic islands are arranged in a recording layer 64 that is supported by a substrate 66. Other layers, such as a heat sink layer 68 may also be included. To form a planarized media, a non-magnetic dielectric material may be positioned in the trenches between the islands. In an unplanarized media, the islands can be spaced apart without any solid material in the spaces between the islands. A bit pattern sensor 62 is positioned adjacent to a track on the media.

In one example, the islands can have a square cross-sectional shape in a plane parallel to, or coincident with, the surface of the media. The islands can be a magnetic material, and dielectric material in the trenches can be for example $SiO_2$. It should be understood that the islands may have other cross-sectional shapes and the shapes may not be uniform.

The bit pattern sensor may respond to magnetic fields from the magnetized islands, as the media moves with respect to the bit pattern sensor, to produce a bit detection signal. The bit detection signal is then processed by the control circuit to produce a synchronization signal that can be used to control the timing of write pulses that are delivered to the write head.

Figure 4:
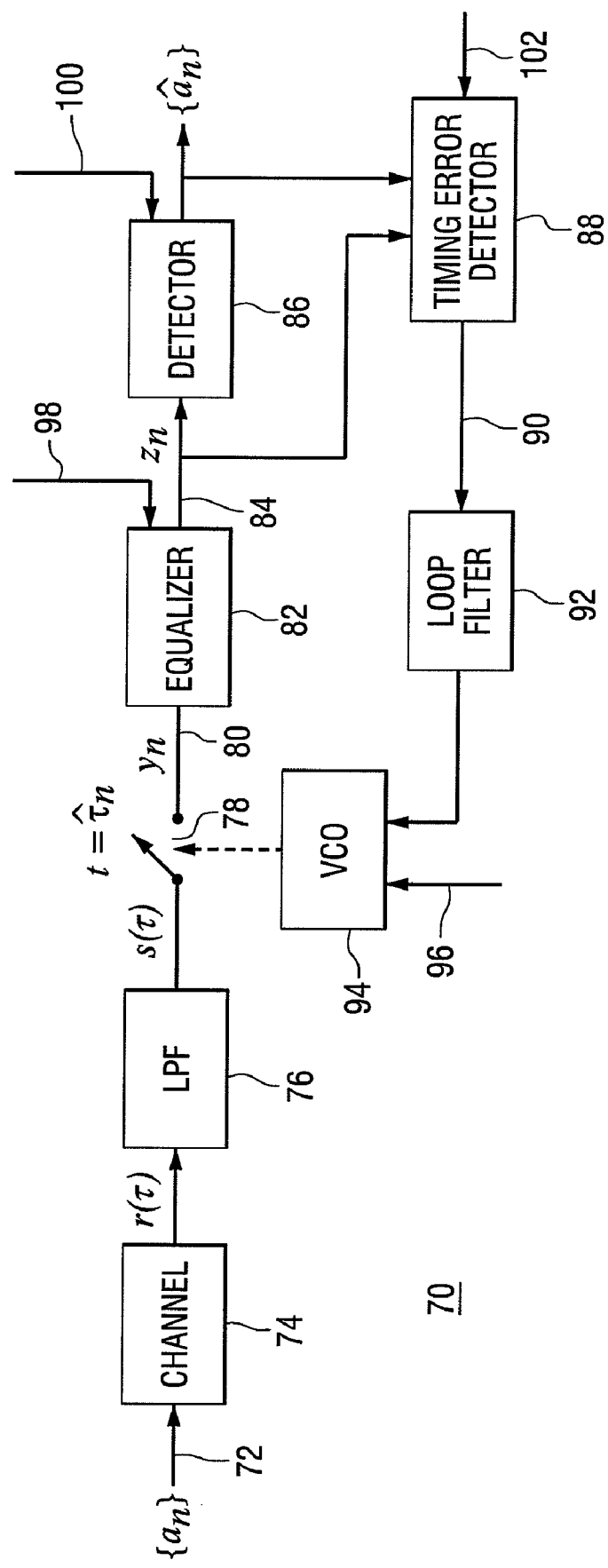
FIG. 4 is a block diagram of a timing recovery circuit.

FIG. 4 is a block diagram of a timing recovery circuit 70. The timing circuit includes a front end including an input 72 to a channel 74, and a low pass filter 76. The channel 74 may be the channel 34 of FIG. 1. The signal produced by the bit pattern sensor is a binary signal $\alpha_n$ that is transmitted through the channel, resulting in a received signal $r(\tau)$. The received signal is filtered by the low pass filter to produce filtered signal $s(\tau)$. The filtered signal is then sampled as illustrated by a sampling switch 78 to produce a sampled signal $y_n$ on line 80. The sampled signal is processed by an equalizer 82 to produce an equalized signal $z_n$ on line 84. The equalized signal is then detected in a detector 86 to produce an output signal $\hat{\alpha}_n$. The output signal serves as a synchronization signal that can be used by the write driver to control the timing of writer pulses delivered to the write head. A timing error detector 88 uses the equalized signal and the output signal $\hat{\alpha}_n$ to produce an error signal on line 90. The error signal is filtered by a loop filter 92 and the output of the loop filter is used to control the frequency of a voltage controlled oscillator 94. The voltage controlled oscillator controls the sampling times that are used to take samples of the filtered signal $s(\tau)$.

Thus it can be seen that for timing detection, a bit pattern sensor produces an analog signal that is sampled to produce a plurality of samples. The timing recovery circuit includes a timing error detector that processes the received samples to produce a quantity, or error signal, on line 90 that is a measure of the timing phase error. This quantity is further passed through a loop filter to produce a correction signal that is used to control the sampling timing, by driving the sampler through a voltage controlled oscillator (VCO). The detected bits in the output signal $\hat{\alpha}_n$ are used by the timing recovery algorithm with the assumption that they are error free.

An equalizer and detector are functions that are needed to detect the end user data bits. Usually a more sophisticated detector is used for that purpose while the timing recovery uses a simple detector to keep the latency or timing loop delay small. The timing recovery process performed by the system of FIG. 4 can be considered to be the "timing recovery algorithm", or more specifically a "decision directed timing recovery algorithm" because it uses the decision bits in a feedback loop.

The sampling instances can deviate from the correct ones as a function of the amount of the phase offset in the system. Similarly, the sampling instances may deviate from the correct ones as a function of the amount of the frequency offset. Moreover, the amount of deviation accumulates at every other sample if there is any frequency offset in the system. The deviation of the actual samples from the desired ones cause a drop in system performance, or even may result in the whole system to collapse.

Under ideal operation, the timing phase is updated by the timing recovery algorithm in a way such that the filtered bit readback signal is sampled at the proper locations. However, noise or other characteristics of the system can sometimes cause incorrect timing updates. During the write operation, the timing phase must ideally be synchronized with the bit island positions. During the read operation, the timing phase must ideally be synchronized with the written pulses. Thus, the timing phase and the timing of the write pulses must ideally be synchronized.

Bit patterned media can have an inherent organizational structure for the bit islands, and the specific characteristics of the bit islands can be utilized to improve timing recovery performance.

In one aspect, this invention provides a method for timing recovery that takes into account specific characteristics of the BPM. Zones on the media can be identified, wherein bit islands in each of the zones have similar physical characteristics. Then, information about the physical characteristics of bit islands in the zones can be used to modify the timing recovery circuit.

In FIG. 4, zone information can be supplied on lines 96, 98, 100, and/or 102. Then the VCO 94, equalizer 82, detector 86, and/or timing error detector 88 can use this zone information to improve the accuracy of the timing recovery function. For example, the nominal frequency of the VCO can be adjusted according to a zone signal on line 96. Alternatively or in combination, the algorithm implemented by the equalizer can be selected according to the zone signal supplied on line 98. In one example, the equalizer may be programmed to implement a plurality of equalization functions that are referenced to a look-up table. Then the zone signal can be used to identify an appropriate equalization function in the table.

Bit patterned media can be produced using a stamping process in which a master bit pattern is impressed on a blank storage medium. The master pattern may include defects or variations that result in the formation of islands that do not have a uniform shape or size, or that are not positioned an equal distance from each other, or that are not positioned exactly on a centerline of data tracks in the media. These variations can result in inaccuracy in the timing signal produced in response to the read sensor signal.

Furthermore, the media may be fabricated using a lithographic process, which may introduce errors in the bit island positions. The bit position errors can cause variations in the jitter noise statistics for different tracks. The net effect is that different parts of the recording surface have inherent differences in media properties such as bit island geometry and jitter statistics. In one aspect, this invention takes advantage of these differences in a synchronization algorithm.

In addition, the geometric structure of the bit locations can be different for different portions of the recording surface. In one example of a bit patterned disc media, the bit island spacings may depend on the track radius. For example, bit islands in tracks that are farther from the center of the disc may be spaced farther apart than bit islands in tracks that are closer to the center of the disc. This example is illustrated in FIG. 5, wherein the disc is divided into several zones such that in each zone, the media properties remain nearly constant.

Figure 5:
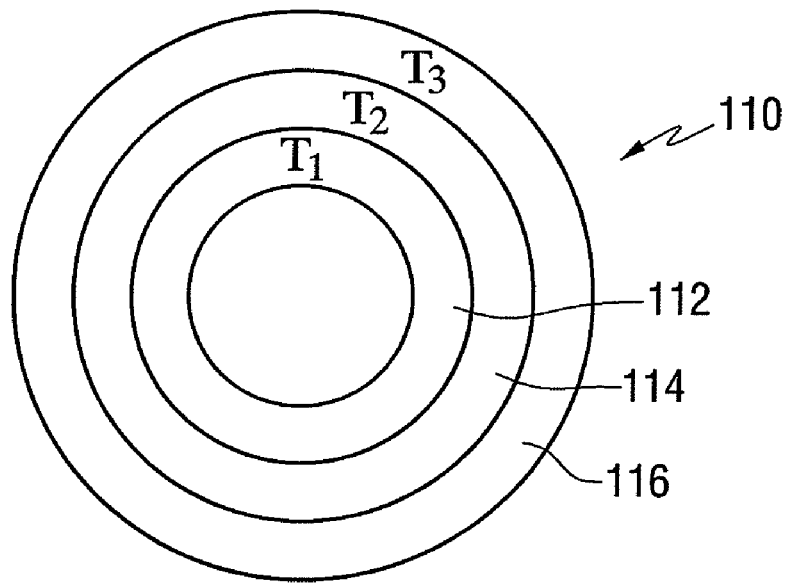
FIG. 5 is a schematic representation of a bit patterned media in the form of a data storage disc.

FIG. 5 is a schematic representation of a bit patterned media in the form of a data storage disc 110. In FIG. 5, the recording surface is partitioned into three zones 112, 114 and 116 such that in each zone the bit spacing is fixed. The bit island spacing, or bit width T, may increase with distance from the center.

Different zones have different nominal values for bit width T, illustrated in FIG. 5 as $T_1$, $T_2$ and $T_3$. This causes variations in baud rate of the signal produced by the bit pattern sensor for different zones. In this case, the zone information can be supplied to the VCO in FIG. 4, so that the nominal clock frequency of the VCO can be adjusted based on the zone of operation. The VCO is controlled by a voltage. When the signal from the loop filter is zero, the VCO oscillates as the nominal frequency. If the signal is positive, the oscillation frequency is slightly larger, and if it is negative, the frequency is smaller. So, in principle the signal from 96 can be added to the output of the loop filter to obtain a single voltage to control the VCO. The signal in 96 can then be considered as a bias term to the VCO input which would be designed to yield the correct nominal frequency depending on the zone.

Figure 6:
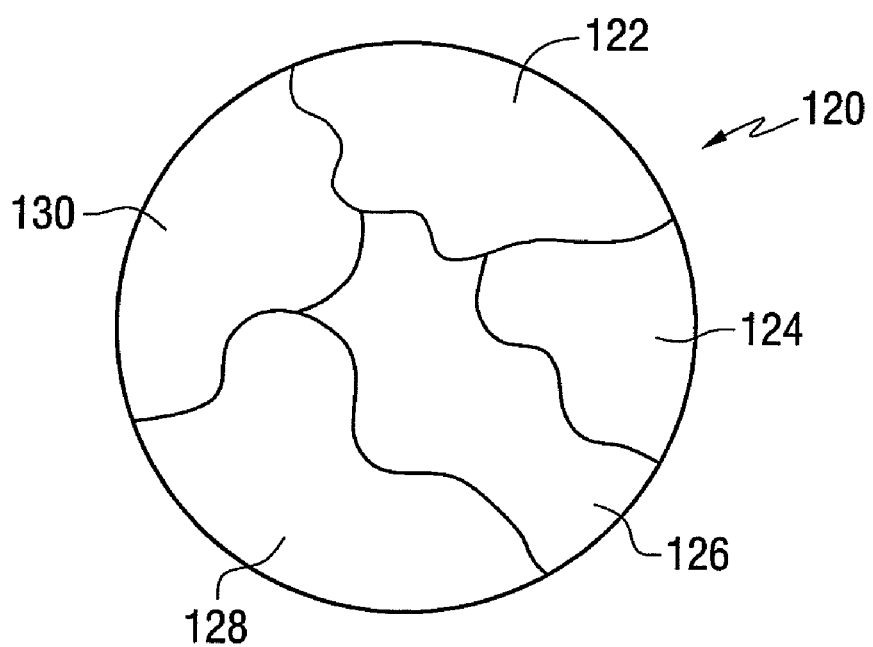
FIG. 6 is a schematic representation of another bit patterned media in the form of a data storage disc.

FIG. 6 is a schematic representation of another bit patterned media 120 in the form of a data storage disc. In FIG. 6, the recording surface includes a plurality of irregularly shaped zones 122, 124, 126, 128 and 130. In this case, various components of the timing recovery circuit can be adjusted based on the zone of operation.

The algorithms used by one or more of the equalizer, detector and/or timing detector can be adapted to each zone in question, based on the properties of the bit islands in that zone. For example, the equalizer block can contain a plurality of equalizers wherein the equalizers are tailored to provide optimal response for the bit island characteristics in one of the zones. Then the zone information signal supplied on line 98 can be used to choose among the different equalizers.

Similarly, the detector block can contain a plurality of detectors wherein the detectors are tailored to provide optimal response for the bit island characteristics in one of the zones. Then the zone information signal supplied on line 100 can be used to choose among the different detectors.

Additionally, the timing error detector block can contain a plurality of timing error detectors wherein the timing error detectors are tailored to provide optimal response for the bit island characteristics in one of the zones. Then the zone information signal supplied on line 102 can be used to choose among the different timing error detectors.

The jitter noise statistics may be different for different zones. Knowledge of this information can be used to improve the detection of the data bits as well as synchronization. The geometric properties in each zone can be determined based on the knowledge of the fabrication process, while the statistical properties of bit jitter can be estimated a priori by training. Optimal training sequences can be developed based on an a priori estimation of the bit jitter statistics for each zone. Then a zone information signal can be produced in response to the bit jitter statistics for each zone.

Figure 7:
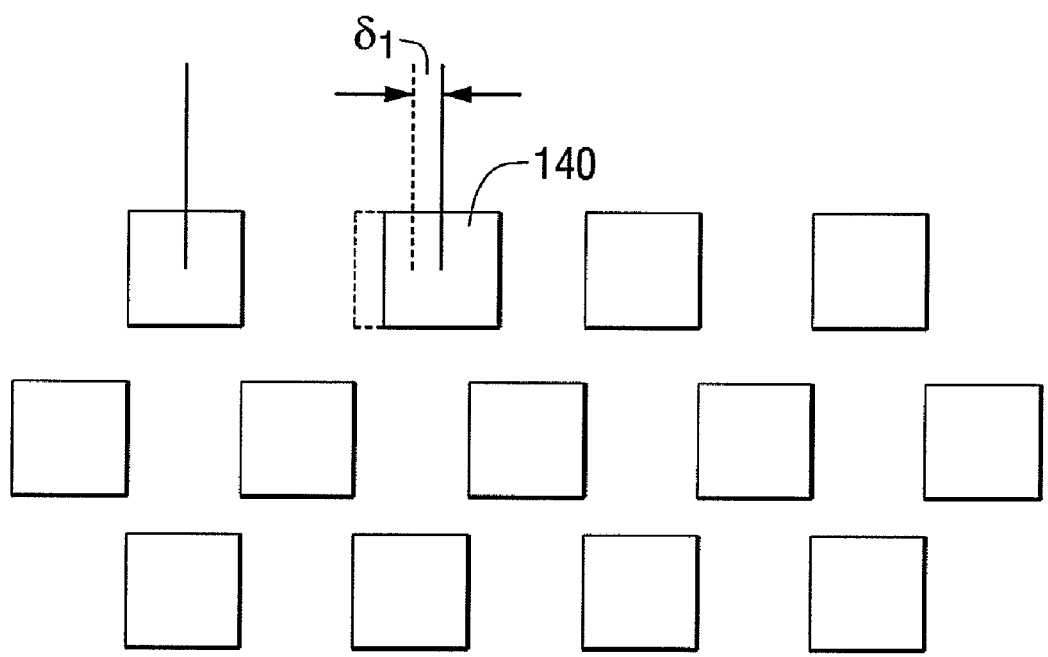
FIG. 7 is a schematic plan view of a bit patterned media.

FIG. 7 is a schematic plan view of a bit patterned media illustrating jitter. In the example of FIG. 7, island 140 is shifted from its desired location by a distance $\delta_1$. If numerous bit islands in a given zone have shifted by some distance $\delta_i$, then the mean of the jitter value can be determined as:

$$\bar{\delta} = \frac{1}{N}\sum_{i=1}^{N}\delta_i$$

and the variance jitter can be determined as:

$$\sigma^2 = \frac{1}{N-1}\sum_{i=1}^{N}(\delta_i - \bar{\delta})^2.$$

Then the mean and/or the variance of the bit island positions can be used to produce a zone information signal that may be used to adjust the equalization algorithm. These jitter noise quantities are essentially "burnt in" during the fabrication and do not change for each write operation.

Figure 8:
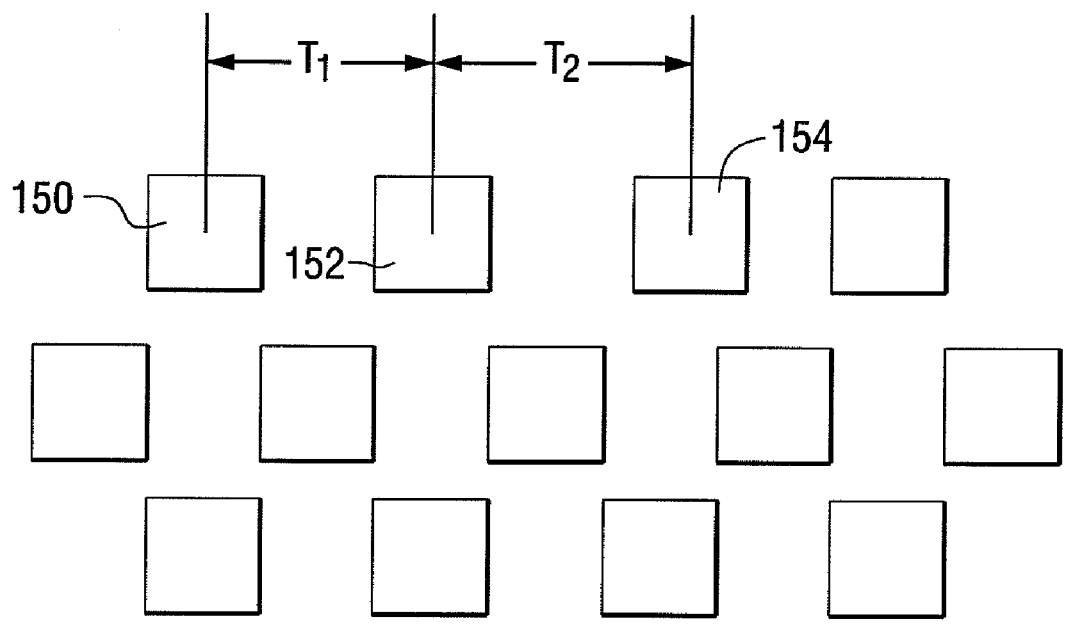
FIG. 8 is a schematic plan view of a bit patterned media.

In another example, different zones can have different nominal values for bit width T, which causes variations in baud rate for different zones. FIG. 8 is a schematic plan view of a bit patterned media wherein the values of T vary. In this example, the distance $T_1$ between bit islands 150 and 152 is smaller than the distance $T_2$ between bit islands 152 and 154. One approach that accounts for differences in bit island spacing is to adapt the nominal clock frequency of the VCO in the synchronizer based on the zone of operation.

Figure 9:
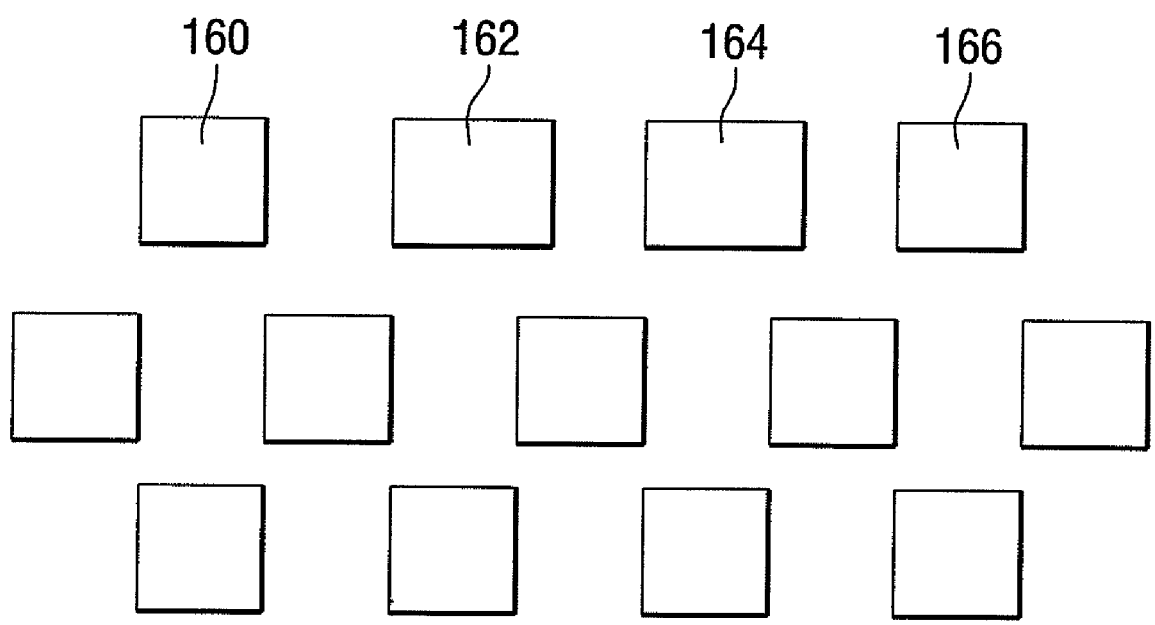
FIG. 9 is a schematic plan view of a bit patterned media.

In another aspect, the invention addresses a situation where island width variation affects an inter-symbol interference profile. FIG. 9 is a schematic plan view of a bit patterned media wherein the island widths vary. In this case, bit islands 162 and 164 are wider than bit islands 160 and 166. This can result in overlap of voltage signals produced by the bit pattern sensor as the sensor detects bit islands 162 and 164. This is referred to as inter-symbol interference (ISI). In this case, the timing error detector of FIG. 4 can be tuned to the ISI profile in each zone of operation. There are many known timing error detectors (TEDs). Examples include the Muller and Mueller timing TED or slope based TEDs which compute the timing error based on the Taylor series expansion of the readback signal with timing errors. All of these methods depend on the channel ISI profile. So regardless of the method used the ISI profile would affect the TED.

In one aspect, this invention provides a method and apparatus for controlling write synchronization in a magnetic recording disc drive with bit patterned media. The write clock signal is controlled in response to physical characteristics of islands in different zones of the media, such that it is not significantly affected by irregularities in the shape, size or location of the islands. Thus data can be accurately written to the patterned data blocks.

While the invention has been described in terms of several examples, it will be apparent that various changes can be made to the described examples without departing from the scope of the invention as set forth in the following claims. The implementations described above and other implementations are within the scope of the following claims.

What is claimed is:

1. A method comprising:
   producing a bit detection signal in response to a plurality of islands located in a plurality of zones of a bit patterned media, wherein the islands in each of the zones have similar physical characteristics;
   producing a zone information signal in response to the physical characteristics of the islands in the zones;
   processing the bit detection signal to produce a synchronization signal, wherein the processing is dependent on the zone information signal; and
   using the synchronization signal to control timing of writing to the bit patterned media.

2. The method of claim 1, further comprising:
   sampling the bit detection signal to produce a sampled signal; and
   controlling timing of the sampling in response to the zone information signal.

3. The method of claim 1, further comprising:
   sampling the bit detection signal to produce a sampled signal; and
   equalizing the sampled signal in response to the zone information signal.

4. The method of claim 1, further comprising:
   sampling the bit detection signal to produce a sampled signal;
   equalizing the sampled signal to produce an equalized signal; and
   detecting the equalized signal in response to the zone information signal.

5. The method of claim 1, further comprising:
   sampling the bit detection signal to produce a sampled signal;
   equalizing the sampled signal to produce an equalized signal;
   detecting the equalized signal to produce an output signal; and
   detecting error between the equalized signal and the output signal in response to the zone information signal.

6. The method of claim 1, wherein the zones are located in rings on the bit patterned media.

7. The method of claim 1, wherein different zones have different nominal values for bit width.

8. The method of claim 1, wherein different zones have different jitter noise statistics.

9. The method of claim 1, wherein different zones have different nominal values for island widths.

10. An apparatus comprising:
    a bit pattern sensor for producing a bit detection signal in response to a plurality of islands located in a plurality of zones of a bit patterned media, wherein the islands in each of the zones have similar physical characteristics;
    circuitry for receiving a zone information signal representative of the physical characteristics of the islands in the zones, and for processing the bit detection signal to produce a synchronization signal, wherein the processing is dependent on the zone information signal; and
    a write driver for using the synchronization signal to control timing of writing to the bit patterned media.

11. The apparatus of claim 10, wherein the circuitry comprises:
    a sampler for sampling the bit detection signal to produce a sampled signal; and
    a voltage controlled oscillator for controlling timing of the sampling in response to the zone information signal.

12. The apparatus of claim 10, wherein the circuitry comprises:
    a sampler for sampling the bit detection signal to produce a sampled signal; and
    an equalizer for equalizing the sampled signal in response to the zone information signal.

13. The apparatus of claim 10, wherein the circuitry comprises:
    a sampler for sampling the bit detection signal to produce a sampled signal;
    an equalizer for equalizing the sampled signal to produce an equalized signal; and
    a detector for detecting the equalized signal in response to the zone information signal.

14. The apparatus of claim 10, wherein the circuitry comprises:
    a sampler for sampling the bit detection signal to produce a sampled signal;
    an equalizer for equalizing the sampled signal to produce an equalized signal;
    a first detector for detecting the equalized signal to produce an output signal; and
    a second detector for detecting errors between the equalized signal and the output signal in response to the zone information signal.

15. The apparatus of claim 10, wherein the zones are located in rings on the bit patterned media.

16. The apparatus of claim 10, wherein different zones have different nominal values for bit width.

17. The apparatus of claim 10, wherein different zones have different jitter noise statistics.

18. The apparatus of claim 10, wherein different zones have different nominal values for island widths.

* * * * *